(No Model.)

W. I. ADAMS.
PHOTOGRAPHIC CAMERA.

No. 357,752. Patented Feb. 15, 1887.

Witnesses
James D. Griswold
Jas. K. Bowen

Inventor
W. Irving Adams
by his attorneys
Gifford & Brown

UNITED STATES PATENT OFFICE.

W. IRVING ADAMS, OF MONTCLAIR, NEW JERSEY, ASSIGNOR TO THE SCOVILL MANUFACTURING COMPANY, OF NEW YORK, N. Y.

PHOTOGRAPHIC CAMERA.

SPECIFICATION forming part of Letters Patent No. 357,752, dated February 15, 1887.

Application filed March 5, 1886. Serial No. 194,098. (No model.)

*To all whom it may concern:*

Be it known that I, W. IRVING ADAMS, of Montclair, in the county of Essex and State of New Jersey, have invented a certain new and useful Improvement in Photographic Cameras, of which the following is a specification.

My invention consists in novel means whereby photographs of larger dimensions can be taken than is usual with ordinary cameras.

I will describe a photographic camera embodying my improvement, and then point out the novel features in the claims.

Figure 1:
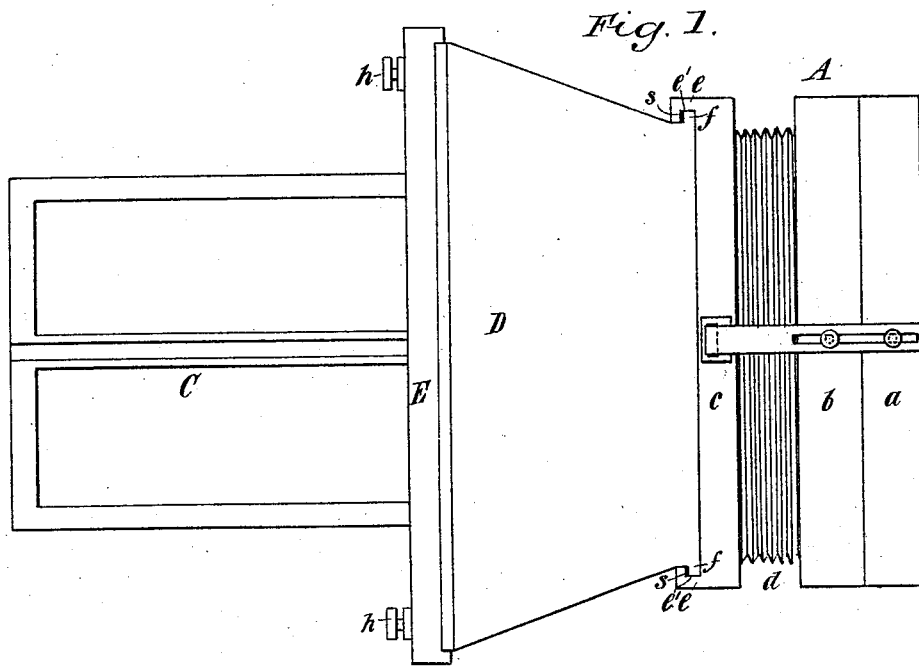
Figure 2:
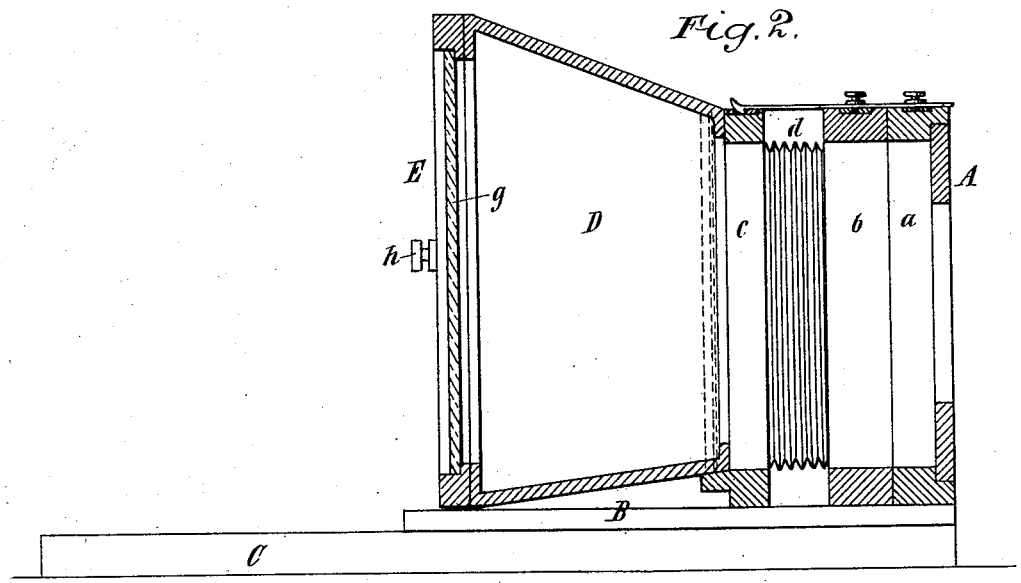

In the accompanying drawings, Figure 1 is a plan or top view of a photographic camera embodying my improvement. Fig. 2 is a longitudinal vertical section of the same.

Similar letters of reference designate corresponding parts in both figures.

A designates the body of the camera. It consists, as usual, of a front section, $a$, section $b$, an extensible back section, $c$, and "bellows" $d$, between the section $b$ and the extensible back section $c$. The sections $a$ $b$ $c$ are of frame-like construction. The body of the camera is mounted upon a supporting basepiece, B, adapted to be moved along upon a frame, C, in the usual or any suitable manner. The extensible back section, $c$, is provided, as shown, with vertical ribs $e$, arranged upon the rear thereof and at the sides. Vertical grooves $e'$, constituting slideways, are arranged in the ribs $e$.

D designates a detachable portion of the camera, which, when in use, is arranged to the rearward of the sliding back section, $c$, and is detachably secured thereto. Such detachable section is open at the ends; but its side walls converge from the rear toward the sliding back section, $c$, so that the opening therein in the end adjoining the sliding section $c$ shall be approximately the same size as the opening in said sliding section. The opening at the rear end of the detachable portion is, however, much larger than the opening at the end where it adjoins the sliding back section, $c$.

Upon the sides of the detachable portion D, adjacent to the end where it joins the sliding section $c$, are arranged vertical ribs $f$. When the detachable section is to be used upon the camera it is secured to the body thereof by moving the ribs $f$ on the detachable portion into the grooves $e'$ in the ribs $e$ upon the sliding back section, $c$. It may as readily be detached therefrom by moving said ribs out of the grooves. Of course the grooves $e'$ might be arranged on the detachable section, and the ribs $f$ upon the sliding back section, $c$, if desirable. Preferably, one of the faces of the ribs $f$, or it may be of the grooves $e'$, will be faced with felt or other suitable material, $s$, so as to form a close, but at the same time loose, joint.

E designates a frame provided with a plate of ground glass, $g$, which is detachably secured to the large end of the detachable portion D. As shown, said frame is held in position on the detachable portion by means of screws $h$, passing through the frame E and into the detachable portion D.

It will be seen that by the use of the detachable portion D a large object may be photographed.

I am aware that it is not new to attach a detachable section to the movable back of a camera by catches engaging grooves on the detachable section; and I do not herein lay claim, broadly, to such form of construction.

What I claim as my invention, and desire to secure by Letters Patent, is—

1. The combination, with the body of a camera provided with a sliding back section, of a detachable portion having flaring sides secured to said sliding back section by means of ribs arranged opposite each other near the edges thereof on the one and sliding in grooves on the other, substantially as specified.

2. The combination, with the body A, provided with the sliding back section, $c$, having vertical grooves $e'$, of a detachable portion, D, provided with ribs $f$, faced with felt or analogous material $s$, substantially as specified.

W. IRVING ADAMS.

Witnesses:
 JOSEPH BARTON,
 HENRY P. SEE, Jr.